United States Patent
Imada

(10) Patent No.: US 10,108,263 B2
(45) Date of Patent: Oct. 23, 2018

(54) INPUT APPARATUS INCLUDING INPUT CANCELLING CIRCUIT

(71) Applicant: FUJITSU LIMITED, Kawasaki-shi, Kanagawa (JP)

(72) Inventor: Tadahiro Imada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/094,013

(22) Filed: Apr. 8, 2016

(65) Prior Publication Data
US 2016/0224112 A1 Aug. 4, 2016

Related U.S. Application Data

(63) Continuation of application No. PCT/JP2013/077764, filed on Oct. 11, 2013.

(51) Int. Cl.
*G06F 3/01* (2006.01)

(52) U.S. Cl.
CPC .................... *G06F 3/014* (2013.01)

(58) Field of Classification Search
CPC .............. G06F 3/044; G06F 3/0416
USPC .................................. 345/173–175
See application file for complete search history.

(56) References Cited

U.S. PATENT DOCUMENTS

| | | | |
|---|---|---|---|
| 2008/0042995 A1* | 2/2008 | Li | G06F 3/014 345/175 |
| 2009/0101417 A1 | 4/2009 | Suzuki et al. | |
| 2009/0156309 A1* | 6/2009 | Weston | A41D 1/002 463/39 |
| 2010/0328205 A1* | 12/2010 | Cheng | G06F 3/017 345/157 |
| 2011/0132181 A1* | 6/2011 | Kockovic | G10H 1/34 84/723 |
| 2012/0157263 A1* | 6/2012 | Sivak | G06F 3/014 482/4 |
| 2013/0082922 A1* | 4/2013 | Miller | G06F 3/017 345/156 |

FOREIGN PATENT DOCUMENTS

| | | |
|---|---|---|
| JP | 2005-135012 | 5/2005 |
| JP | 2007-287086 | 11/2007 |
| JP | 2008-509488 | 3/2008 |
| JP | 2008-203911 | 9/2008 |
| JP | 2009-111996 | 5/2009 |
| JP | 2012-181792 | 9/2012 |

OTHER PUBLICATIONS

International Search Report of PCT/JP2013/077764 dated Nov. 12, 2013 (1 page).

* cited by examiner

*Primary Examiner* — Calvin C Ma
(74) *Attorney, Agent, or Firm* — Fujitsu Patent Center

(57) ABSTRACT

The present application aims at restraining an erroneous input to an input apparatus fitted to a hand for use. The input apparatus includes a touch input accepting circuit to be attached to at least any one of five fingers of a hand, and an input cancelling circuit to cancel an input to the input accepting circuit upon touching the input accepting circuit, the input cancelling circuit being attached to a finger neighboring to the finger, with the input accepting circuit attached, of the five fingers.

4 Claims, 5 Drawing Sheets

FIG. 4

| | STATE OF HAND | STATE OF SWITCH |
|---|---|---|
| NON-INPUT | | |
| NORMAL INPUT | | |
| ERRONEOUS INPUT | | |

INPUT APPARATUS INCLUDING INPUT CANCELLING CIRCUIT

CROSS-REFERENCE TO RELATED APPLICATION

This application is a continuation application of International Application PCT/JP2013/077764, filed on Oct. 11, 2013, and designated the U.S., the entire contents of which are incorporated herein by reference.

FIELD

The present application pertains to an input apparatus.

BACKGROUND

Electronic equipment is provided with a variety of input apparatuses. For example, a computer and a mobile terminal use the input apparatuses instanced by keyboards, touch panels and other equivalent apparatuses. Input apparatuses instanced by push button switches, key switches and other equivalent switches in addition to the keyboards and the touch panels are used for console panels of a variety of machines like manufacturing equipment and a transport apparatus. In recent years, glove shaped input apparatuses fitted to hands for use have been also developed (refer to, e.g., Patent documents 1-3).

PATENT DOCUMENT

[Patent document 1] Japanese Patent Application Laid-Open Publication No. 2007-287086
[Patent document 2] Japanese Patent Application Laid-Open Publication No. 2005-135012
[Patent document 3] Japanese Patent Application Laid-Open Publication No. 2012-181792

SUMMARY

The present application discloses an input apparatus that follows. The input apparatus includes: a touch input accepting circuit (unit) to be attached to at least any one of five fingers of a hand; and an input cancelling circuit (unit) to cancel an input to the input accepting circuit upon touching the input accepting circuit, the input cancelling circuit being attached to a finger neighboring to the finger, with the input accepting circuit attached, of the five fingers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 4 is a diagram illustrating one example of a relationship between states of the hand and states of the switch.

DESCRIPTION OF EMBODIMENTS

An embodiment will hereinafter be described. The following embodiment is a mere exemplification, and the technical scope of the present disclosure is not limited to the mode that follows.

Figure 1:
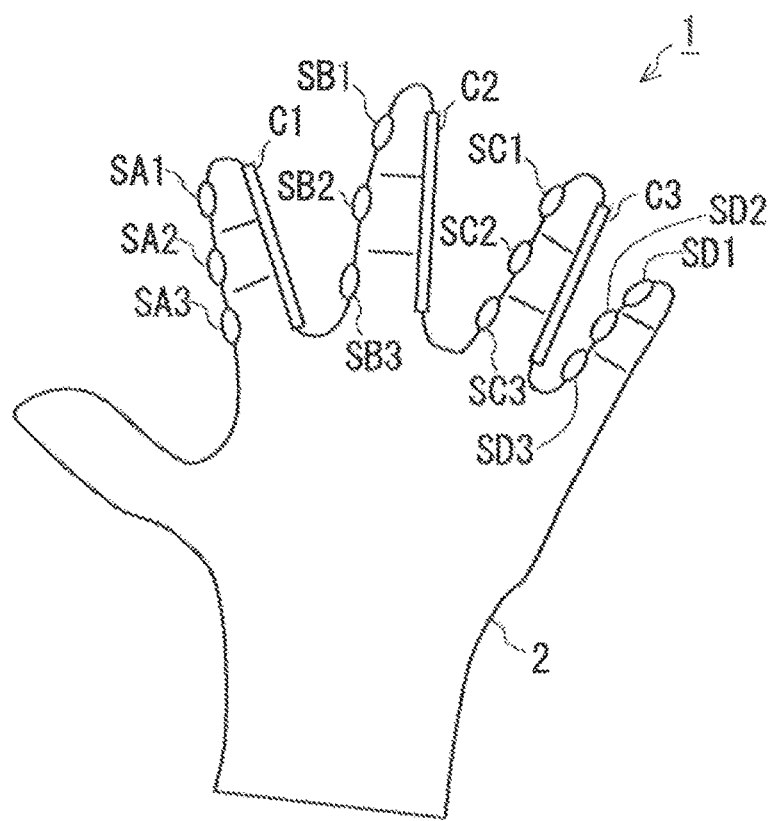
FIG. 1 is a view illustrating one example of an input apparatus according to an embodiment.

FIG. 1 is a view illustrating one example of an input apparatus according to the embodiment. An input apparatus 1 according to the embodiment is, as illustrated in FIG. 1, e.g., a glove-shaped input apparatus including switches (which are one example of an "input accepting circuit" according to the present application) and cancellers (which are one example of an "input cancelling circuit" according to the present application). The input apparatus 1 may be attached to any of a right hand, a left hand and both hands.

Note that members representing the switches are designated respectively by numero symbols SA1-SA3, SB1-SB3, SC1-SC3 and SD1-SD3 in FIG. 1. In the following discussion, the numero symbol subsequent to "S" is to be omitted when describing at least any one unspecified switch among the switches SA1-SA3, SB1-SB3, SC1-SC3 and SD1-SD3. In FIG. 1, members representing the cancellers are designated respectively by numero symbols C1-C3. In the following discussion, the numeral subsequent to "C" is to be omitted when describing at least any one unspecified canceller among the cancellers C1-C3.

The switch S and the canceller C are attached to a glove 2 fittable to a human hand. The glove 2 is made of a flexible material not hindering motions of a user's hand. The switch S configured to accept a variety of user's operations is enabled to accept inputs of various items of information instanced by characters, numerals and signs or symbols to be processed by an information processing apparatus, inputs of operations for controlling machines and equipments, and other multiple inputs.

The switch S can be disposed on a part pressable by, e.g., a thumb. The parts pressable by the thumb are, e.g., parts, corresponding to side faces on an existing side of the thumb, of fingers (a forefinger, a second finger, a third finger, a little finger) exclusive of the thumb with respect to individual portions of the glove 2. The side face of the finger is part of an entire surface of the finger and is instanced by a side face in a face-to-face relationship with a neighboring finger. Note that the respective switches S are disposed on the portions corresponding to the side faces, on the existing side of the thumb, of both side faces of the fingers exclusive of the thumb in FIG. 1. It does not, however, mean that the switches S are limited to the arrangement described above. Based on a premise that the respective switches are operated by fingers of another hand not fitted with the input apparatus 1, the switches S may be attached to the thumb or alternatively attached to parts corresponding to side faces, on an existing side of the little finger, of both side faces of the fingers.

The switch S is a touch sensitive switch electrified upon a touch of the finger, and a variety of switches applicable to the switch S are exemplified by a push button switch with a contact being closed upon pushing a button, a touch switch configured to detect a touch of the finger from a variation of electrostatic capacity, a pressure sensitive switch configured to detect the touch of the finger from a variation of pressure, an electrode switch configured to detect the touch of the finger from a variation of resistance value between a couple of electrodes, and other equivalent switches.

Although the switches S are provided by threes at all the fingers other than the thumb, it does not, however, mean that the input apparatus 1 is limited to this mode. The input apparatus 1 may be configured so that one or two switches S is provided at, e.g., one finger, and the single finger is provided with three or more switches S. The respective switches S may be disposed in a state of being spaced from each other and also in a state of abutting on each other. The switch S and the canceller C may be composed of metals, resins and other equivalent materials, and may also be composed of a material flexible not to hinder motions of the user's hand. The switch S and the canceller C can be made flexible to such a degree as not to hinder the user's motions by using, e.g., a conductive resilient member and other equivalent members.

The canceller C cancels an input to the switch S upon touching the switch S. The canceller C is disposed at apart touchable on the switch S when the user unintentionally moves the hand to cause an input to the switch S. Positions for disposing the cancellers C can be instanced by parts, on the existing side of the little finger, of both side faces of the fingers, these parts corresponding to the side faces of the fingers neighboring to the fingers to which the switches are attached. The following is a table indicating a corresponding relationship between the cancellers C1-C3 and the switches S of which the inputs are cancelled by these cancellers.

TABLE 1

| Cancellers | Switches To Be Cancelled |
|---|---|
| C1 | SB1 |
|  | SB2 |
|  | SB3 |
| C2 | SC1 |
|  | SC2 |
|  | SC3 |
| C3 | SD1 |
|  | SD2 |
|  | SD3 |

The canceller C1 attached to the forefinger cancels, e.g., the inputs to the switches SB1-SB3 attached to the second finger. The canceller C2 attached to the second cancels, e.g., the inputs to the switches SC1-SC3 attached to the third finger. The canceller C3 attached to the third finger cancels, e.g., the inputs to the switches SD1-SD3 attached to the little finger.

The cancellers C may be whatever types of cancellers if capable of cancelling the inputs to the switches S even when touching the switches S. As will be described later on, it is preferable that the cancellers C are selected properly from within a group of elements of a variety of mechanical or electrical components, which are matched with the types of the switches S.

The switch S is, e.g., the push button switch with the contact being closed upon pushing the button, in which case the canceller C can involve using a sensor to detect a pressing force smaller than a pressing force required for opening and closing the contact of the switch S. The sensor may be whatever type of sensor if capable of detecting the touch on the switch S, and applicable sensors are a sensor to detect a load on, e.g., the push button switch, and other various types of sensors. The canceller C, if configured to use the sensor to detect the pressing force smaller than the pressing force required for opening and closing the contact of the switch S, outputs a sensor signal in advance of closing the contact of the switch S when the finger neighboring to the finger with the switch S attached touches the switch S. Hence, a circuit or a program of a processing device of equipment connected to the input apparatus 1 is designed to cancel the input to the switch S when the canceller C outputs the sensor signal, thereby enabling the canceller C to cancel an erroneous input to the switch S from the finger with the canceller C attached.

Figure 2:
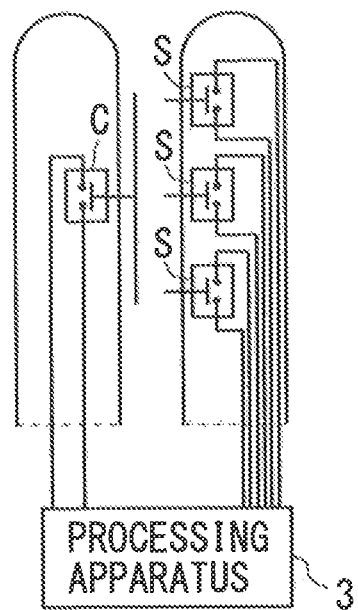
FIG. 2 is a diagram of one example of circuitries when each of a switch and a canceller is configured by using a push button switch.

FIG. 2 illustrates one example of circuitries when each of the switch S and the canceller C adopts a push button switch. Note that FIG. 2 illustrates only a combination of one canceller C and target switches S with their inputs being cancelled by this canceller C for convenience of explanation, and the same configuration is, however, applied to other combinations. The switches S and the canceller C connect to a processing device 3. The processing device 3 may be whatever type of device if capable of processing the signals of the switches S and the canceller C. For example, as illustrated in FIG. 2, when each of the switch S and the canceller C adopts the push button switch, the canceller C corresponding to the three switches S attached to any one of the five fingers is attached to the finger neighboring to the finger with the switches S attached. When the switch S touches the finger with the canceller C attached, the contact of the switch used as the canceller C is switched ON. The processing device 3 connecting to the switches S and the canceller C executes a following processing flow upon an ON-state of the switch S.

Figure 3:
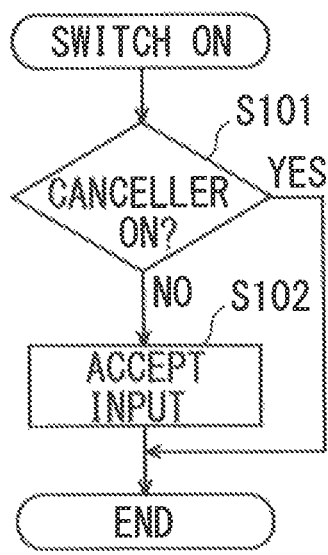
FIG. 3 is a flowchart illustrating one example of a processing flow to be executed by a processing apparatus that processes signals of the switch and the canceller.

FIG. 3 is a flowchart illustrating one example of the processing flow to be executed by the processing device 3 configured to process the signals of the switches S and the canceller C. The processing device 3, when the switch S reaches the ON-state, determines whether the canceller C is in the ON-state or not (S101). The processing device 3, when determining in the process of S101 that the canceller C is not in the ON-state, accepts an input from the switch S (S102). The processing device 3, whereas when determining in the process of S101 that the canceller C is in the ON-state, skips the process (S102) of accepting the input from the switch S.

FIG. 4 is a diagram illustrating one example of a relationship between states of the hand states of the switch. Each of the switch S and the canceller C adopts the push button switch, in which case the relationship between the hand of the hand and the state of the switch becomes as below. The user is in a state of, e.g., spreading the fingers in a non-input status of the user not intending any input to the input apparatus 1. In the state of spreading the fingers, as indicated in a "non-input" field in FIG. 4, the contact of each of the switches used as the switch S and the canceller C is in an open state. The user, in the state of user's inputting to the input apparatus 1, pushes any one of the switches S by, e.g., the thumb. In the state of pushing any one of the switches S by the thumb, e.g., as indicated in a "normal input" field in FIG. 4, only the contact of the switch S pushed by the thumb is in a close state, while the contacts of all other switches used for the remaining switches S and the cancellers C are in an open state. The state of the user moving the hand without intending the input to the input apparatus 1 is instanced as one example by conducting a motion of grasping an object. In the state of conducting the motion of grasping the object, the finger neighboring to the finger with the switch S attached touches the switch S, and the canceller C detects the touch on the switch S. Hence, for example, each of the contacts becomes the close state as indicated in an "erroneous input" field, these contacts being of anyone of the three switches S attached to one finger and of the switch of the canceller C attached to the finger neighboring to the finger with the switches S attached. Accordingly, the signal of the canceller C may be used as an element for determining whether the input to the switch S is erroneous.

The input apparatus 1, when each of the switch S and the canceller C involves using the push button switch, adopts the circuitries and the processing flow described above and is thereby enabled to restrain the erroneous input in the case of the user's moving the hand without intending the input.

For example, the switch S is the push button switch with the contact being closed upon pushing the button, in which case the canceller C may be composed of a flexible member relieving the pressing force acting on the switch S even when touching the switch S. Materials applicable to the flexible member are exemplified by a sponge, silicon and other equivalent materials that are easily deformable by being pressed. With the canceller C being composed of the flexible member, the contact of the switch S is hard to close even when the switch S is touched by the finger neighboring to the finger with the push button switch S attached. The canceller C composed of the flexible material is therefore enabled to cancel the erroneous input to the switch S from the finger with the canceller C attached. The canceller C, when composed of the flexible material, can cancel the erroneous input to the switch S also in the case of the switch S being configured as the pressure sensitive switch to detect the touch of the finger from a variation of pressure similarly to the case of the push button switch.

The switch S is, e.g., the touch switch configured to detect the touch of the finger from a variation of electrostatic capacity, in which case the canceller C may be composed of such a material as to make the variation of electrostatic capacity when touching the switch S smaller than in the case of the touch of the finger. With the canceller C being composed of the material reducing influence exerted on the electrostatic capacity, the switch S does not detect the touch even when the finger neighboring to the finger with the touch switch S attached touches the switch S. Hence, the canceller C composed of the material reducing the influence exerted on the electrostatic capacity can cancel the erroneous input to the switch S from the finger with the canceller C attached.

The switch S is, e.g., the electrode switch configured to detect the touch of the finger from the variation of resistance value between the couple of electrodes, in which case the canceller C may be composed of a material having a conductivity different from a conductivity of the finger. For example, when the canceller C is constructed by, e.g., a member having an insulating property, the variation of resistance value upon touching the switch S is smaller than in the case of the touch of the finger. With the canceller C being constructed by, e.g., a conductive member, the variation of resistance value upon touching the switch S is larger than in the case of the touch of the finger. With the canceller C being composed of a material having the conductivity different from the conductivity of the finger, the switch S does not sense the touch even when the switch S is touched by the finger neighboring to the finger with the electrode switch S attached. The canceller C composed of the material having the conductivity different from the conductivity of the finger, can cancel the erroneous input to the switch S from the finger with the canceller C attached.

The sensor to detect the touch of the switch S, the flexible member, the member to restrain the variation of electrostatic capacity, the member having the insulating property or the conductive member may be used as the canceller C in a state of being properly combined mutually with other members. For example, the canceller C may also be configured so that the sensor to detect the touch of the switch S is further covered with the flexible member.

Figure 5:
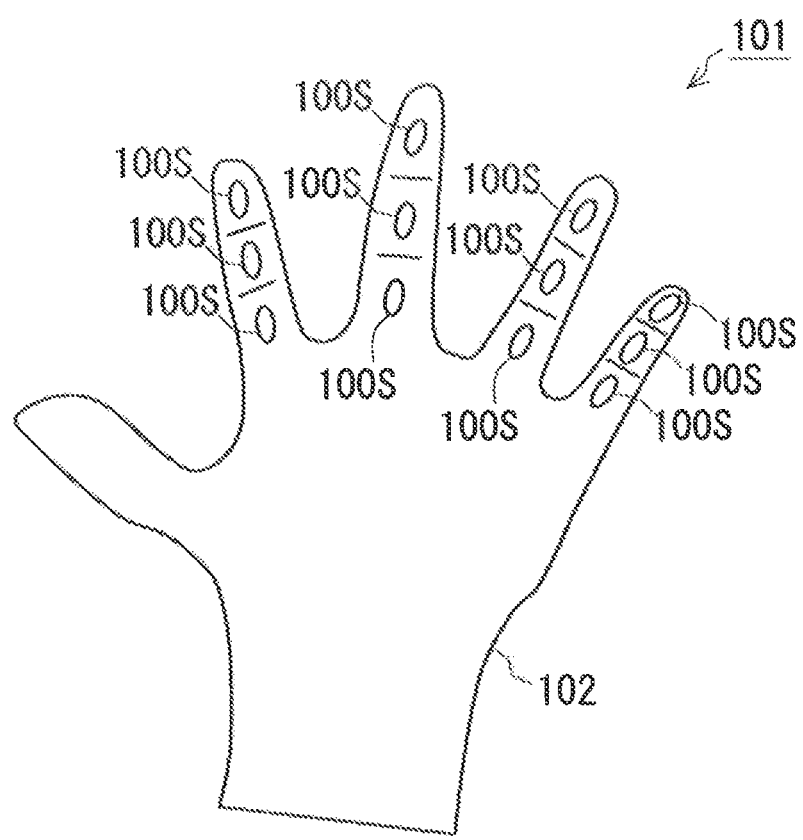
FIG. 5 is a view illustrating one example of an input apparatus according to a comparative example.

FIG. 5 is a view illustrating one example of an input apparatus according to a comparative example. An input apparatus 101 according to the comparative example is, as depicted in FIG. 5, e.g., a glove-shaped input apparatus including switches 100S. The input apparatus 101 according to the comparative example does not, however, include a component equivalent to the canceller C provided in the input apparatus 1 according to the embodiment. The switches 100S are attached to a glove 102 fittable to the human hand. Similarly to the switches S, the switches 100S accept the variety of user's operations. The switches 100S are disposed at the fingers (the forefinger, the second finger, the third finger, the little finger) exclusive of the thumb with respect to individual portions of the glove 102. The switches 100S are, however, disposed not at the parts corresponding to the side faces of the fingers but at parts corresponding to faces on the side of a palm.

Performed was a test for confirming an effect of the canceller C by comparing the input apparatus 1 according to the embodiment with the input apparatus 101 according to the comparative example. The user's motion of moving the hand without intending the input is given as one example by a motion that the user grasps and lifts a dumbbell placed on a floor till a body gets straight and thereafter puts the dumbbell again on the floor. Then, this comparative test was performed by repeating 100 times the motion of grasping and lifting the dumbbell placed on the floor till the body gets straight and thereafter putting the dumbbell again on the floor. The comparative test was performed by using three types of dumbbells, i.e., a 1 kg dumbbell, a 2 kg dumbbell and a 5 kg dumbbell. A following table indicates test results.

TABLE 2

| Structure | Load | Average Erroneous Input Count |
| --- | --- | --- |
| Comparative Example | 1 kg | 2 |
|  | 2 kg | 3 |
|  | 5 kg | 5 |
| Example 1 | 1 kg | 0 |
|  | 2 kg | 0 |
|  | 5 kg | 0 |
| Example 2 | 1 kg | 0 |
|  | 2 kg | 0 |
|  | 5 kg | 0 |

Note that the comparative test involved using the push button switch with the contact being closed upon pushing the button for each of the switch S of the input apparatus 1 according to the embodiment and the switch 100S of the input apparatus 101 according to the comparative example. In the Table give above, "Example 1" is an instance of using the flexible material for the canceller C, and "Example 2" is an instance of using the sensor capable of detecting the touch of the switch S for the canceller C.

As apparent from the Table, approximately two through five erroneous inputs on the average were confirmed by the input apparatus 101 according to the comparative example in a process of conducting once the motion of grasping and lifting the dumbbell placed on the floor till the body gets straight and thereafter putting the dumbbell again on the floor. While on the other hand, the erroneous input was confirmed in neither "Example 1" nor "Example 2" by the input apparatus 1 according to the embodiment. Hence, it is recognized from this comparative test that the input apparatus 1 according to the embodiment is enabled to restrain the erroneous input caused when the user moves the hand without intending the input as compared with the input apparatus 101 according to the comparative example.

Figure 6:
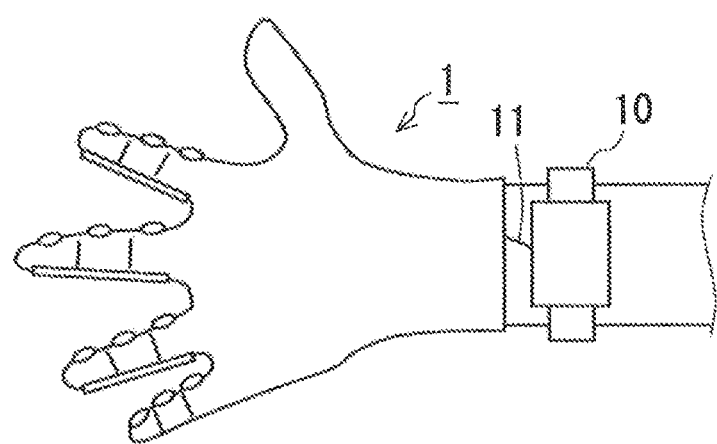
FIG. 6 is a view illustrating one example when using the input apparatus by connecting to a wrist watch shaped information terminal.

The input apparatus 1 according to the embodiment can be used by connecting to, e.g., an information processing apparatus instanced by a computer, a mobile terminal and other equivalent apparatuses, a control apparatus for a variety of machines instanced by manufacturing equipment and a transport apparatus, and other equivalent control apparatuses. FIG. 6 is a view illustrating one example when using the input apparatus 1 by connecting to a wrist watch shaped information terminal. A wrist watch shaped information terminal 10 may have, e.g., a built-in CPU (Central Processing Unit), a built-in display device and other equivalent built-in devices. The wrist watch shaped information terminal 10 is connected to the input apparatus 1 via, e.g., a cable 11 and is thereby enabled to receive an input of information by detecting the operation on each switch S of the input apparatus 1. The cable 11 may be a cable pursuant to highly versatile standards instanced by USB (Universal Serial Bus) and other equivalent standards, and may also be a cable pursuant to a dedicated standard designed for the input apparatus 1. The input apparatus 1 may be, e.g., wirelessly connected to other apparatuses without being limited to the wired connection to other apparatuses. When the input apparatus 1 according to the embodiment is used by connecting to, e.g., the wrist watch shaped information terminal 10 as illustrated in FIG. 6, the user can input the information to the information terminal 10 in a state enabling an arm to move unrestrictedly.

Over the recent years, portable electronics have been continuously downsized, resulting in narrowing an area for accepting the input of characters and other equivalent elements. The portable electronics are in a rapid widespread use as communication tools for character data instanced by e-mails in addition to conventional voice speech tools. Along with the use as the communication tools, the portable electronics also have frequent occasions of inputting the characters, numerals and symbols. However, as the portable electronics are increasingly reduced in weight and downsized, it is hard to maintain operability of inputting the characters, the numerals and the symbols. In this respect, the input apparatus 1 according to the embodiment is the glove shaped apparatus separate from the portable electronics and is therefore enabled to facilitate the input operation and to restrain the erroneous input while attaining a further downsized portable electronics.

The input apparatus 1 according to the embodiment enables the canceller C to cancel the erroneous input to the switch S, whereby the operability can be enhanced. The input apparatus 1 according to the embodiment enables the cancellation of the erroneous input not intended by the user when performing the motion instanced by grasping and touching the object in an as-is state of the input apparatus 1 being fitted to the hand. Hence, the input apparatus 1 according to the embodiment can be used in such a scene as to manually conduct the variety of works in the as-is state of the input apparatus 1 being fitted to the hand.

The input apparatus fitted to the hand for use has a possibility of causing an erroneous input when a user moves the hand without intending an input. Such being the case, the present application aims at restraining the erroneous input to the input apparatus fitted to the hand for use.

The input apparatus can restrain the erroneous input when the user moves the hand without intending the input.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An input apparatus comprising:
    a touch input accepting circuit to be attached to a first finger of a hand; and
    an input cancelling circuit to cancel an input by contact of the input cancelling circuit to the input accepting circuit upon touching the input accepting circuit, the input cancelling circuit being attached to a second finger neighboring to the first finger.

2. The input apparatus according to claim 1, wherein the input accepting circuit is attached to a side face of the first finger, and
    the input cancelling circuit is attached to a face of the second finger, in a face-to-face relation with the input accepting circuit.

3. The input apparatus according to claim 1, wherein the input cancelling circuit includes a sensor to output a signal for cancelling the input to the input accepting circuit upon touching the input accepting circuit.

4. The input apparatus according to claim 1, wherein the input accepting circuit is a pressing switch, and
    the input cancelling circuit includes a flexible member to relieve a pressing force on the switch.

* * * * *